United States Patent
Jeong et al.

(10) Patent No.: US 11,047,616 B2
(45) Date of Patent: Jun. 29, 2021

(54) REFRIGERATOR AND VACUUM INSULATION MODULE THEREOF

(71) Applicant: Samsung Electronics Co., Ltd., Suwon-si (KR)

(72) Inventors: Hyun Ku Jeong, Yongin-si (KR); Dae Hwan Kim, Seoul (KR); Choong Hyo Jang, Daejeon (KR); Keon Kuk, Yongin-si (KR); Jun O Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 272 days.

(21) Appl. No.: 15/540,220

(22) PCT Filed: Dec. 16, 2015

(86) PCT No.: PCT/KR2015/013808
§ 371 (c)(1),
(2) Date: Jun. 27, 2017

(87) PCT Pub. No.: WO2016/105019
PCT Pub. Date: Jun. 30, 2016

(65) Prior Publication Data
US 2018/0017314 A1   Jan. 18, 2018

(30) Foreign Application Priority Data

Dec. 26, 2014  (KR) .......... 10-2014-0190409

(51) Int. Cl.
F25D 23/06        (2006.01)
F25D 23/02        (2006.01)

(52) U.S. Cl.
CPC .......... *F25D 23/062* (2013.01); *F25D 23/02* (2013.01); *F25D 23/06* (2013.01); *F25D 23/061* (2013.01);

(Continued)

(58) Field of Classification Search
CPC .... F25D 23/066; F25D 23/065; F25D 23/062; F25D 23/063; F25D 23/02; F25D 23/06; F25D 23/061; F25D 23/067
See application file for complete search history.

(56) References Cited

U.S. PATENT DOCUMENTS 5,007,226 A * 4/1991 Nelson ............... F25D 23/02
                                                        52/407.2
7,913,511 B2 * 3/2011 Meyer ............... F25D 11/003
                                                        62/371

(Continued)

FOREIGN PATENT DOCUMENTS

CN         2713404 Y      7/2005
CN       103502756 A      1/2014

(Continued)

OTHER PUBLICATIONS

Machine Translation,"Description JPH0814486", Jan. 16, 1996, pp. 1-9, printed from www.espace.net.*

(Continued)

*Primary Examiner* — Kimberley S Wright
(74) *Attorney, Agent, or Firm* — Jefferson IP Law, LLP

(57) ABSTRACT

Provided is a refrigerator including an inner case, a storage compartment formed inside the inner case, an outer case provided outside the inner case, and a plurality of vacuum insulation modules provided between the inner case and the outer case to insulate the storage compartment, and each of the plurality of vacuum insulation modules includes a vacuum insulator, and a cartridge which accommodates the vacuum insulator and supports the inner case and the outer case. The cartridge has a mutual coupling portion coupled to the cartridge of an adjacent vacuum insulation module. Accordingly, the vacuum insulator can be easily manufactured without an additional support frame or a foaming (Continued)

process, and sufficient strength and coupling force can be secured by using only the vacuum insulator.

14 Claims, 19 Drawing Sheets

(52) U.S. Cl.
CPC .......... *F25D 23/067* (2013.01); *F25D 23/063* (2013.01); *F25D 23/068* (2013.01); *F25D 2201/14* (2013.01); *F25D 2500/02* (2013.01)

(56) References Cited

U.S. PATENT DOCUMENTS

| | | | |
|---|---|---|---|
| 8,117,792 B2 | 2/2012 | Kim et al. | |
| 8,899,068 B2* | 12/2014 | Jung | F25D 23/062 62/440 |
| 9,651,292 B2* | 5/2017 | Jung | F25D 23/062 |
| 10,161,670 B2* | 12/2018 | Jung | F25D 23/066 |
| 2004/0069789 A1 | 4/2004 | Ohno et al. | |
| 2004/0226956 A1 | 11/2004 | Brooks | |
| 2007/0152551 A1 | 7/2007 | Kim et al. | |
| 2011/0031254 A1* | 2/2011 | Mortarotti | B29C 44/1238 220/592.2 |
| 2012/0103006 A1* | 5/2012 | Jung | F25D 23/062 62/440 |
| 2017/0159996 A1* | 6/2017 | Deka | F25D 23/062 |
| 2017/0370632 A1* | 12/2017 | Jeong | F25D 23/067 |
| 2018/0238609 A1* | 8/2018 | Uchida | B32B 5/26 |

FOREIGN PATENT DOCUMENTS

| | | |
|---|---|---|
| CN | 107110593 A | 8/2017 |
| EP | 2 789 952 A1 | 10/2014 |
| JP | 08-014486 A | 1/1996 |
| JP | 09-269177 A | 10/1997 |
| JP | 2014-031904 A | 2/2014 |

OTHER PUBLICATIONS

Machine Translation, "Description JP2014031904", Feb. 20, 2014, pp. 1-11, printed on www.espace.net.*
Chinese Office Action dated Apr. 23, 2019, issued in a counterpart Chinese application No. 201580076693.5.
Chinese Office Action dated Jan. 19, 2020, issued in a counterpart Chinese application No. 201580076693.5.
Korean Office Action dated Apr. 1, 2021, issued in Korean Application No. 10-2014-0190409.
Korean Notice of Patent Allowance dated Apr. 8, 2021, issued in Korean Application No. 10-2014-0190409.

* cited by examiner

[Fig. 1]
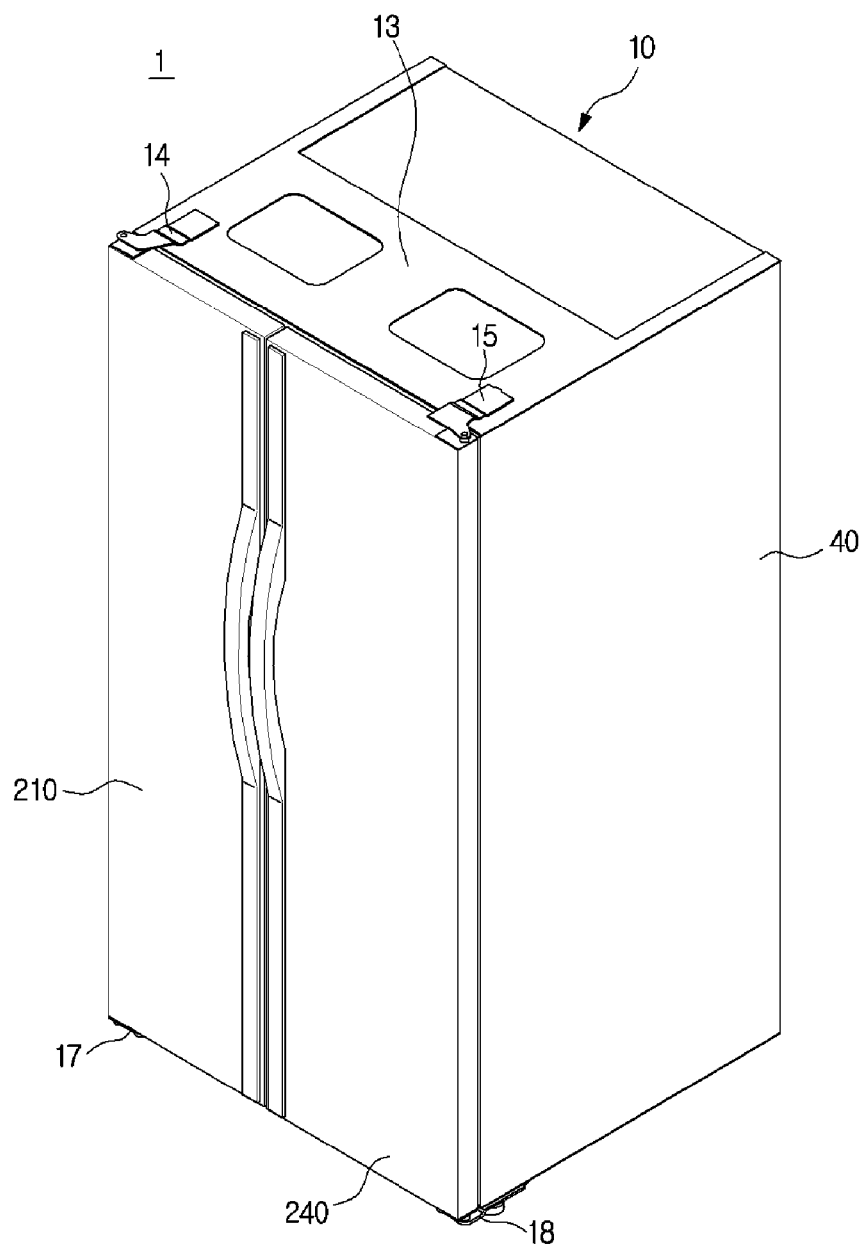

[Fig. 2]
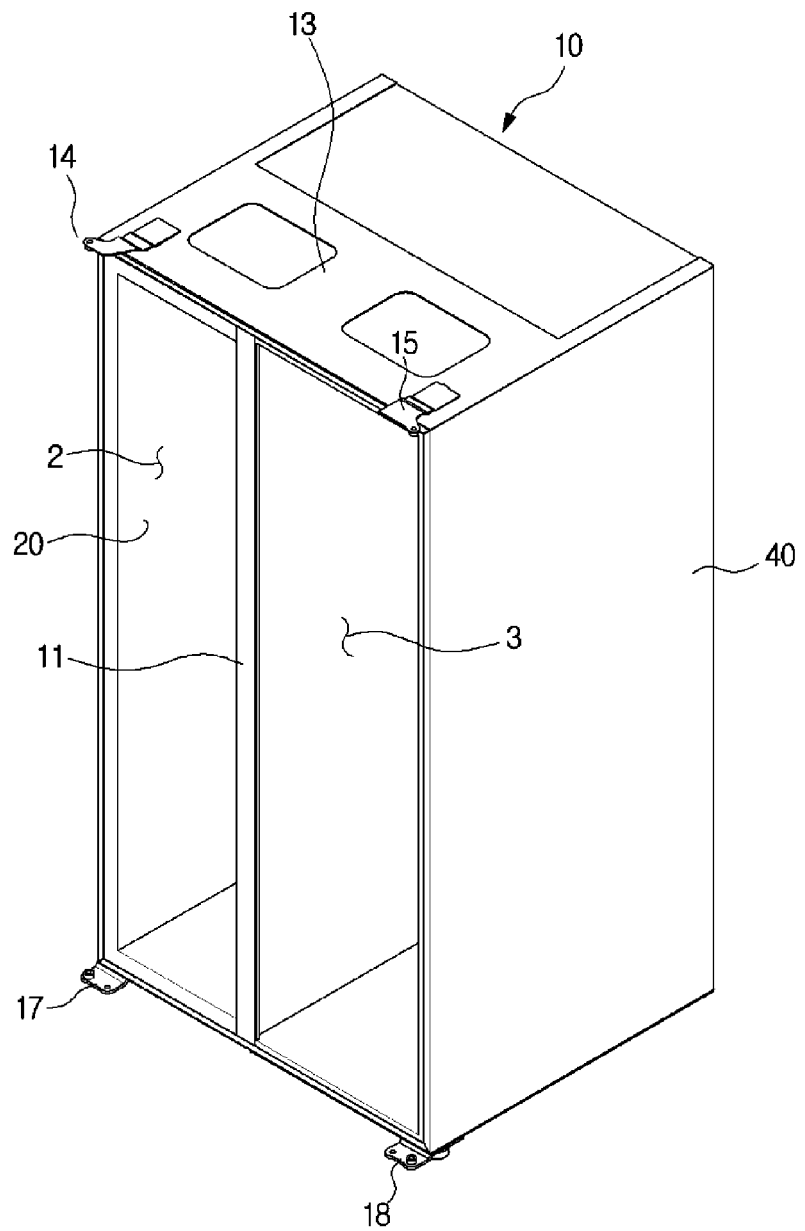

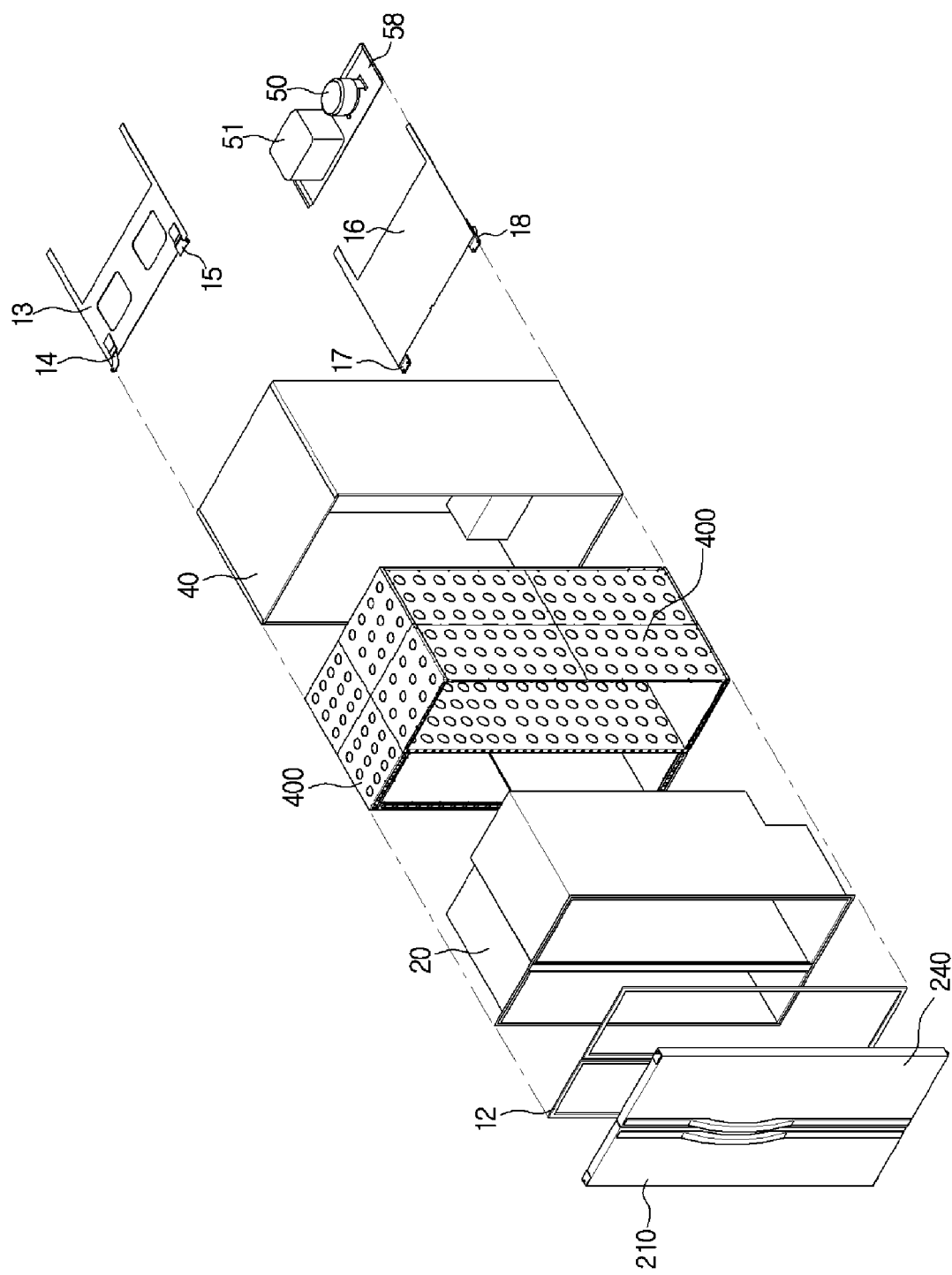
[Fig. 3]

[Fig. 4]
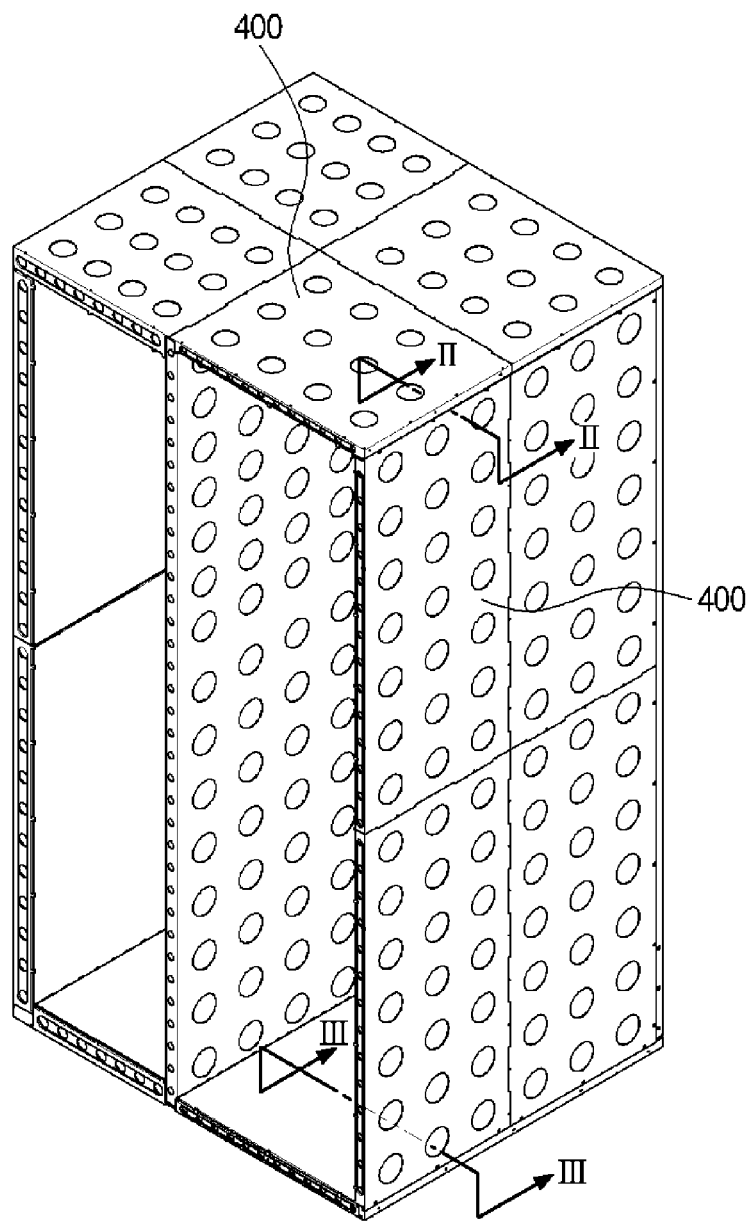

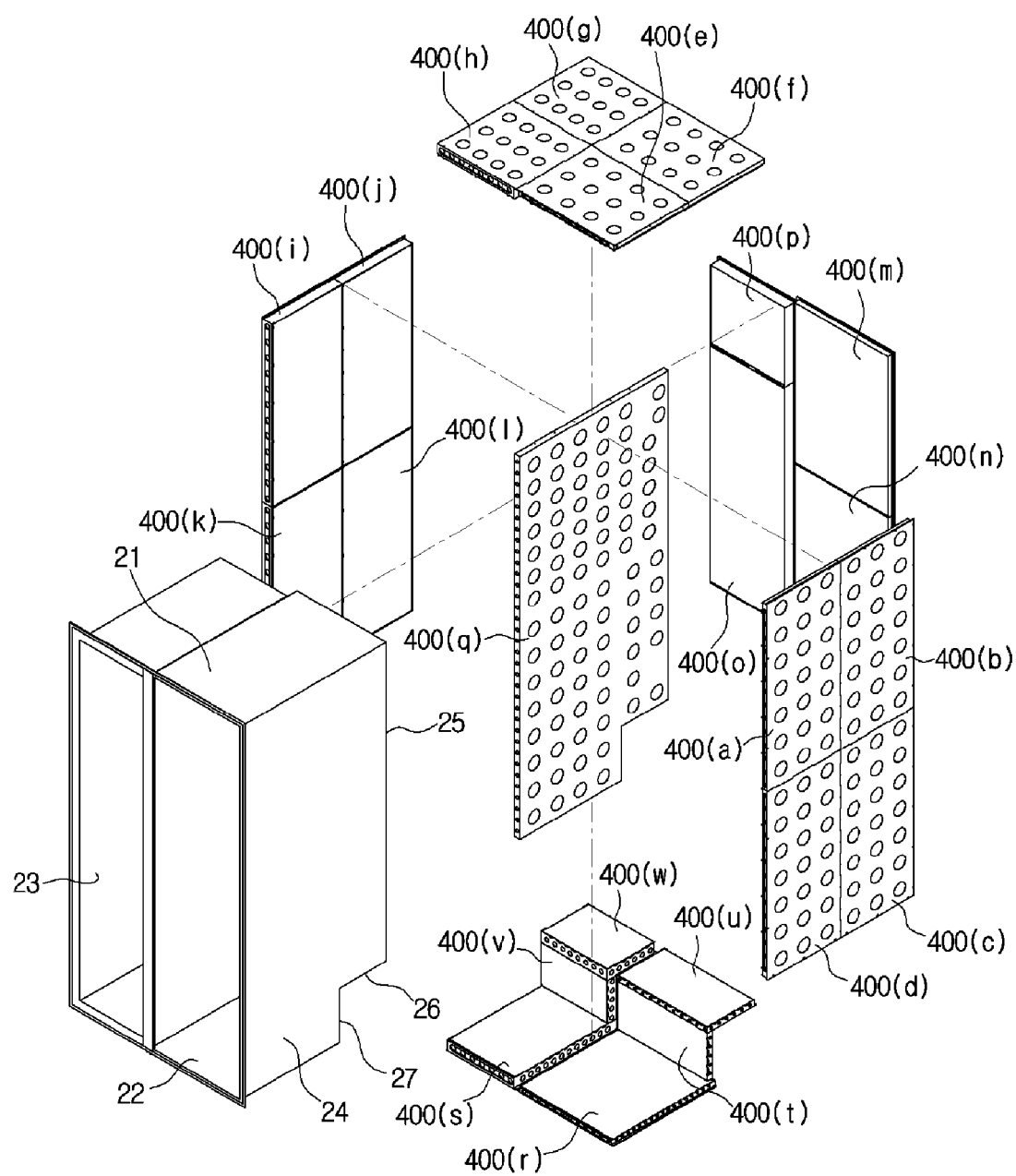
[Fig. 5]

[Fig. 6]
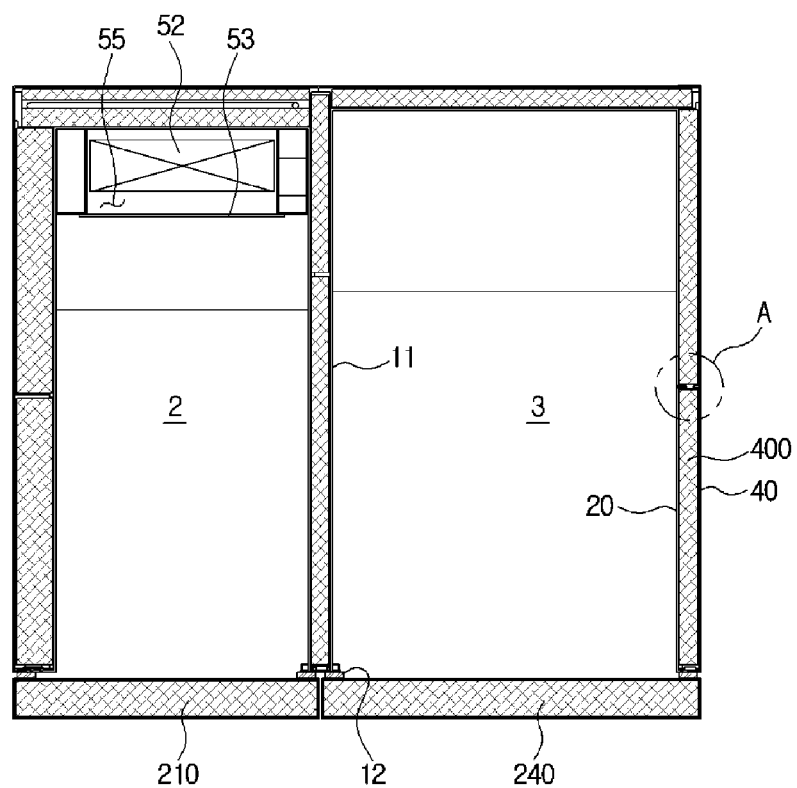

[Fig. 7]
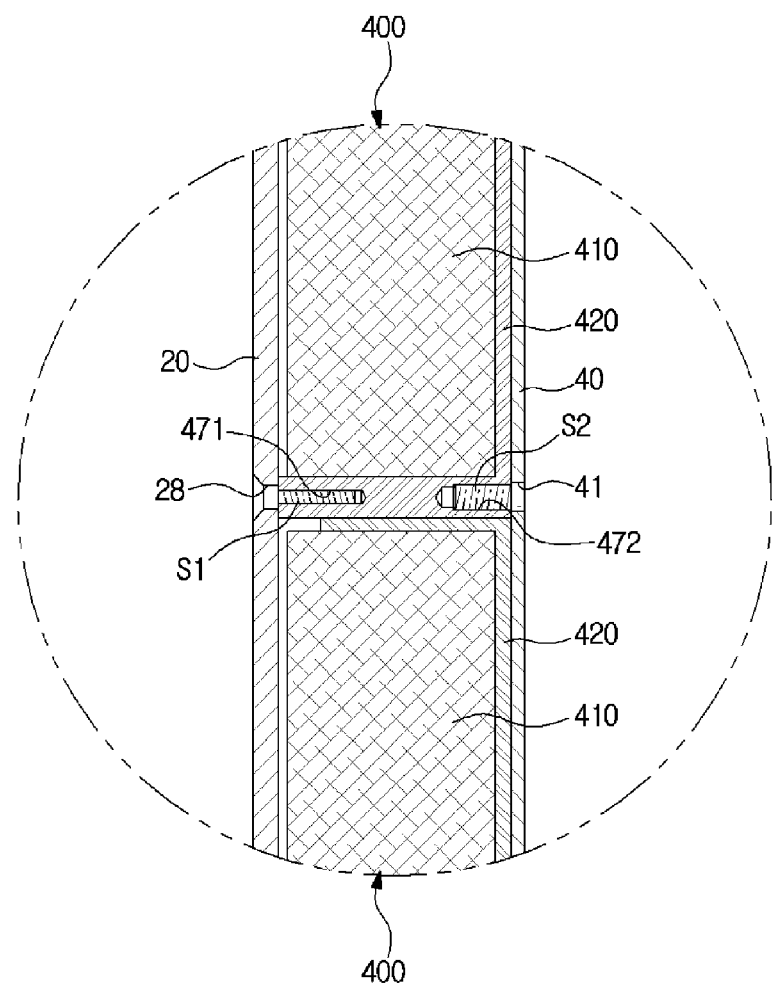

[Fig. 8]
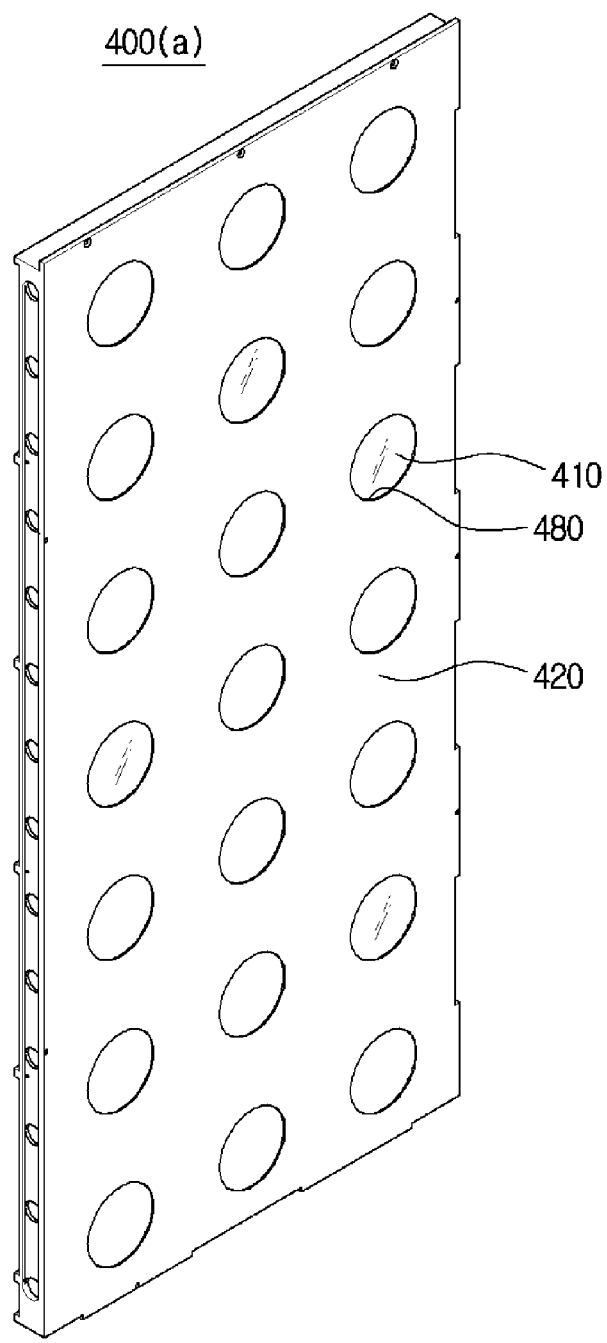

[Fig. 9]
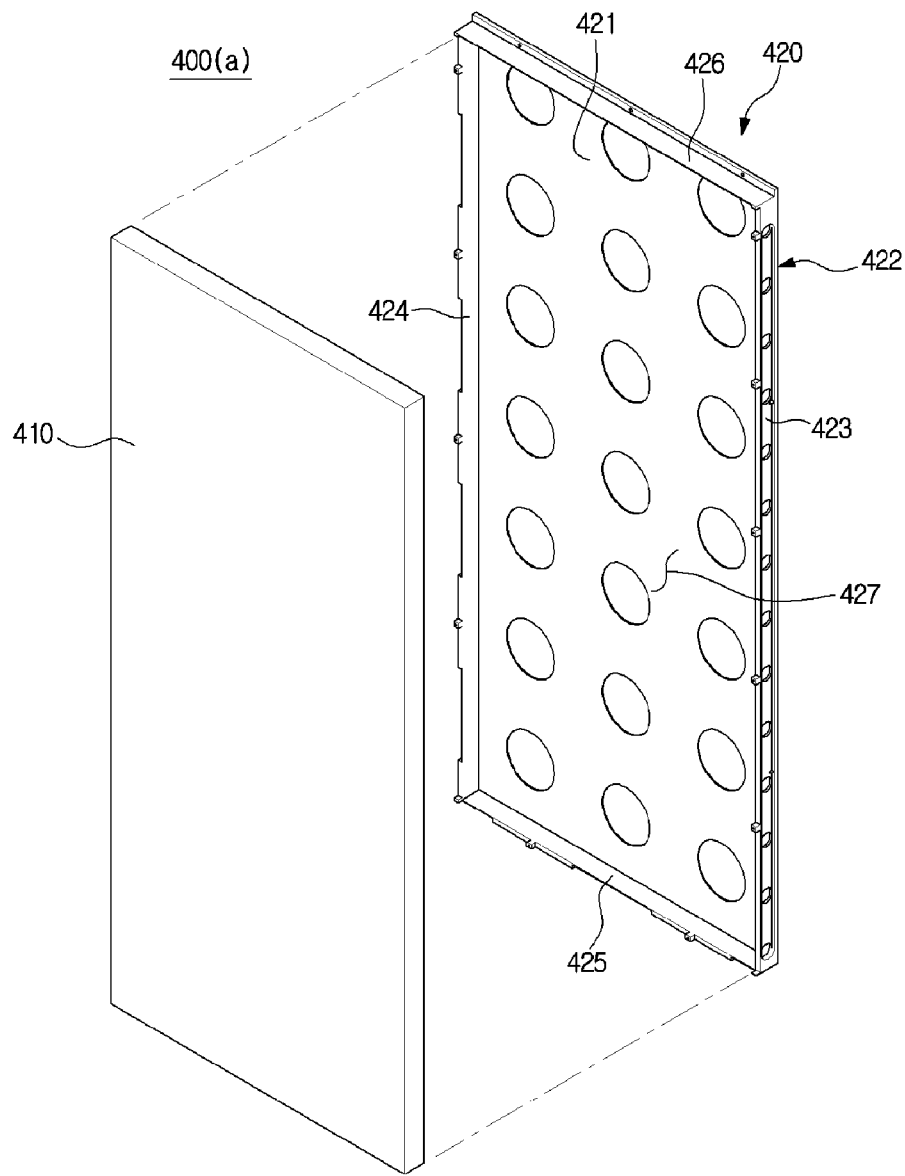
[Fig. 10]
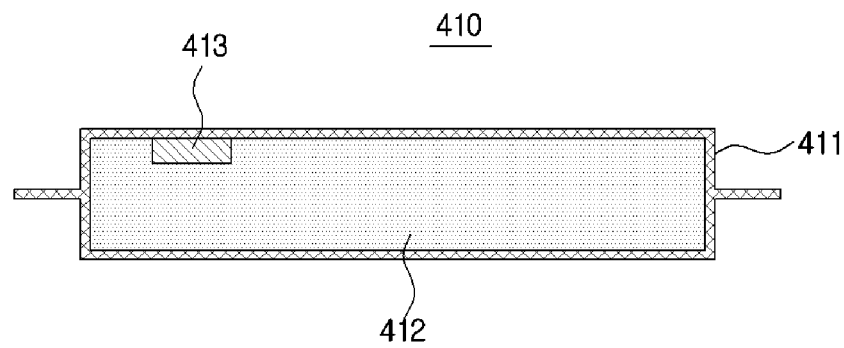

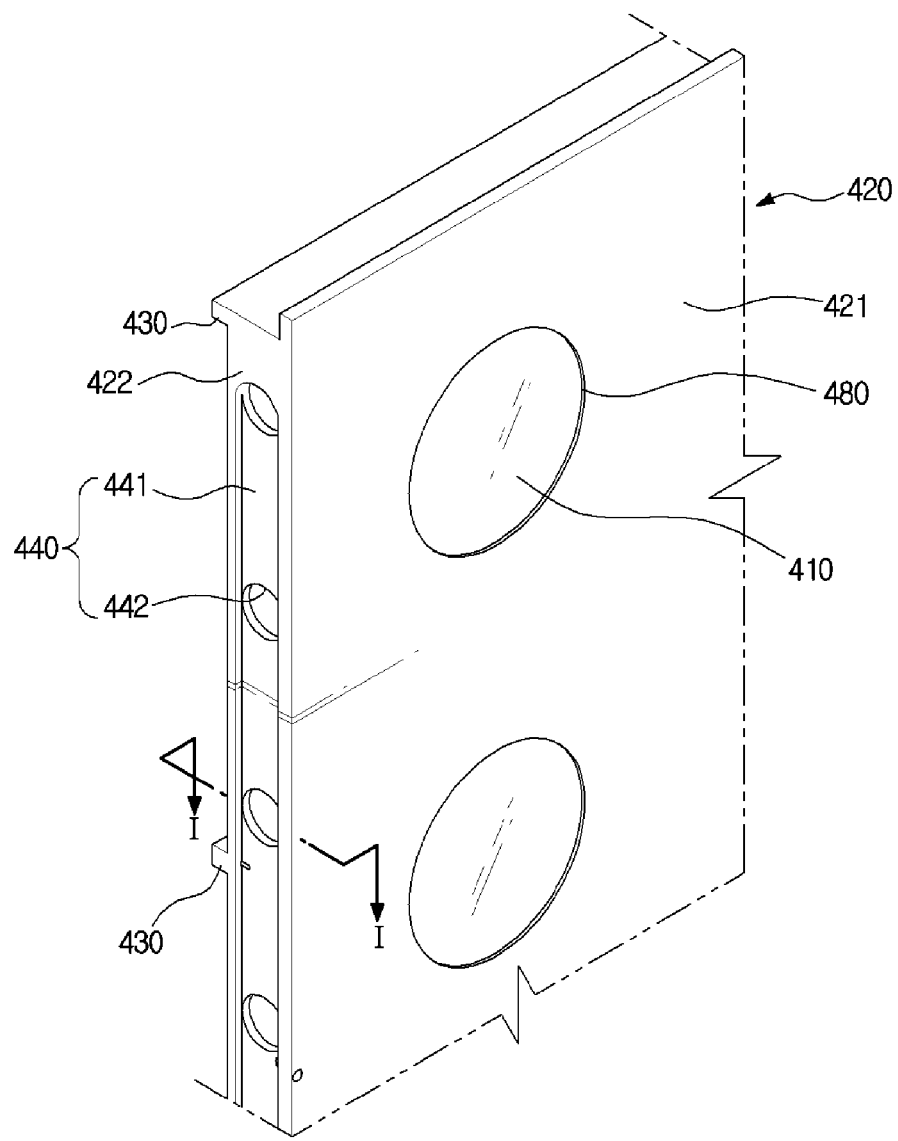
[Fig. 11]

[Fig. 12]
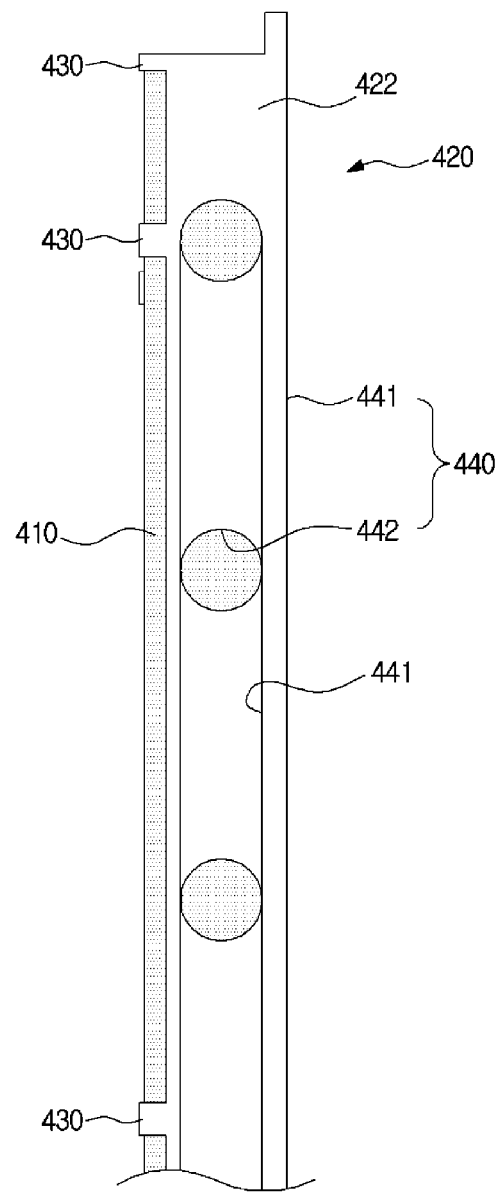

[Fig. 13]
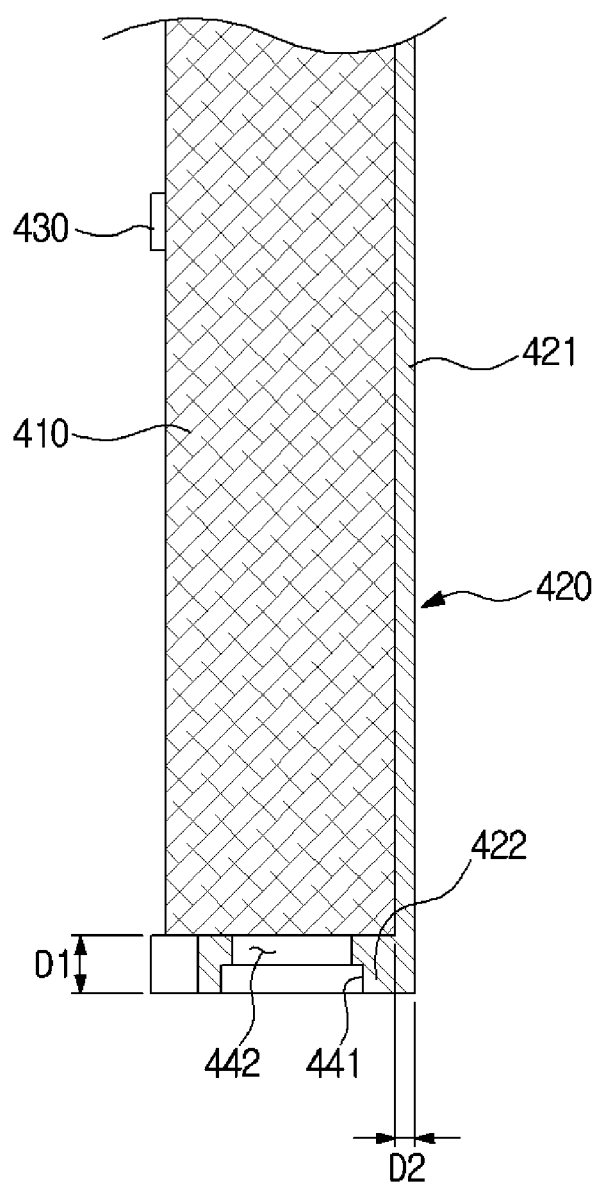

[Fig. 14]
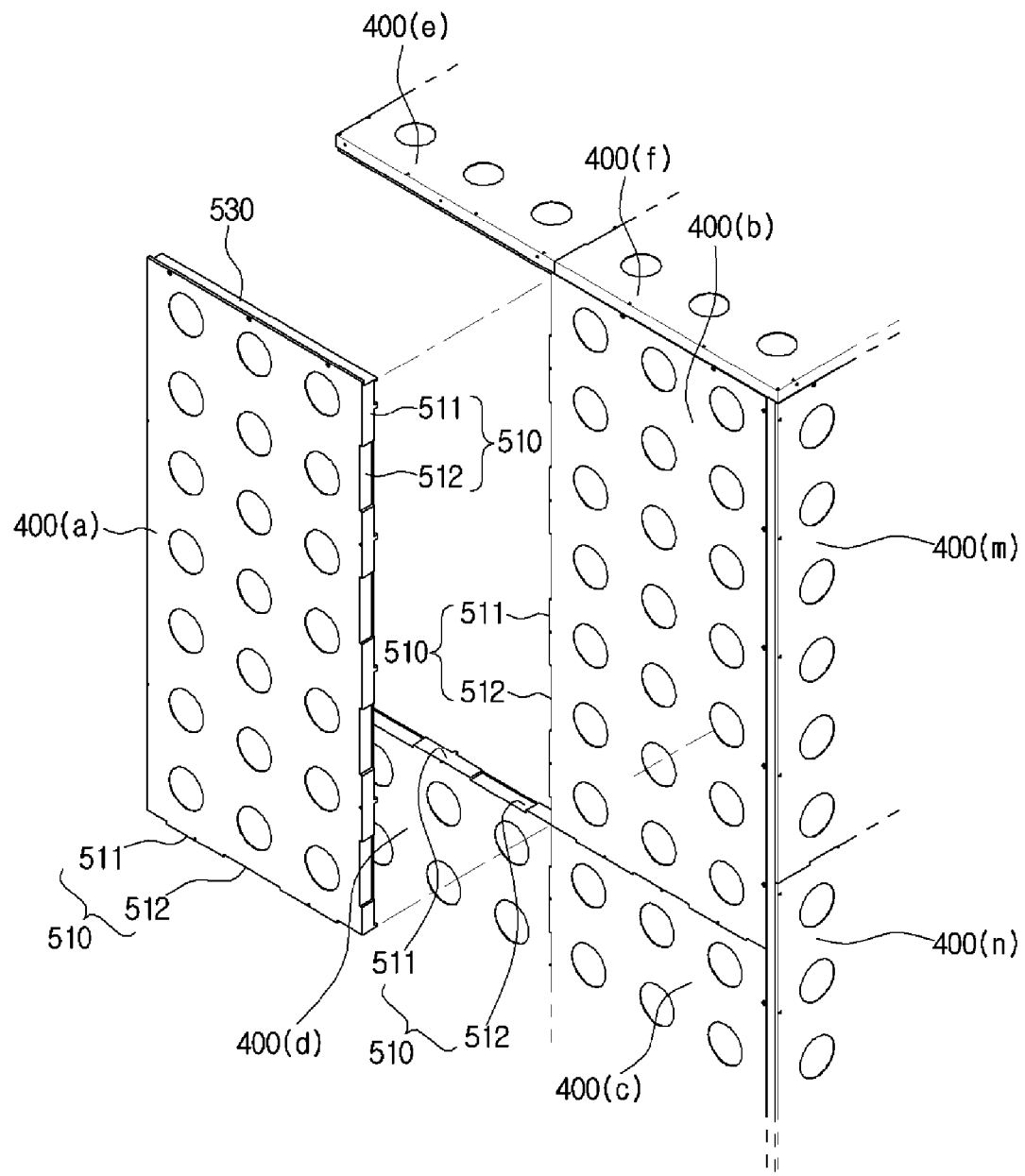

[Fig. 15]
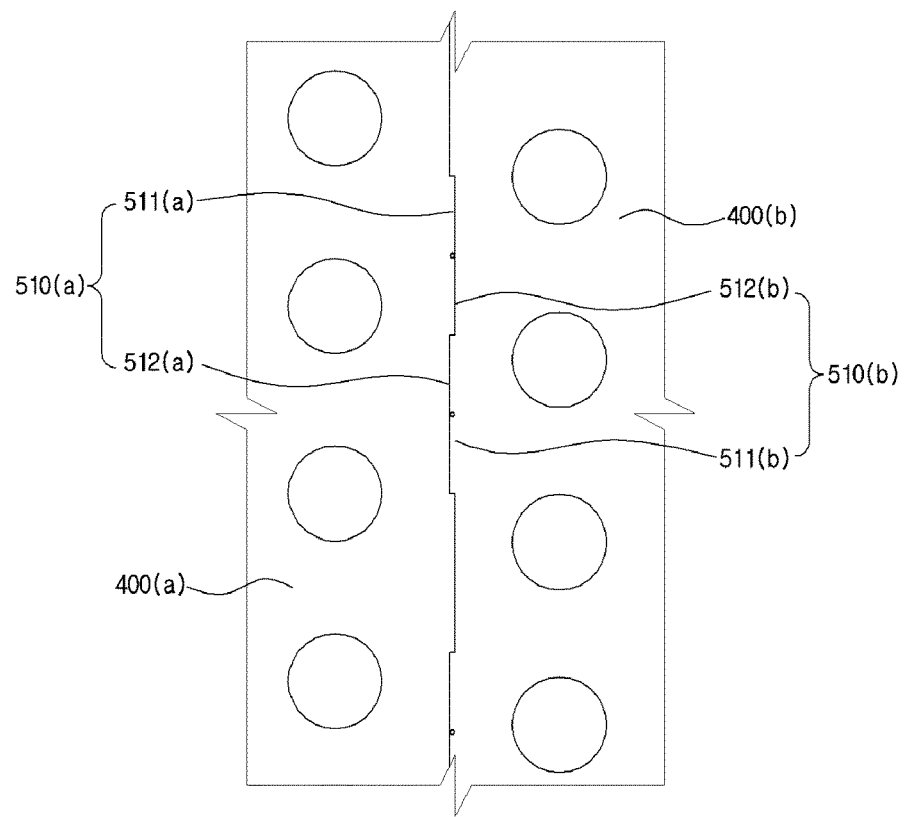
[Fig. 16]
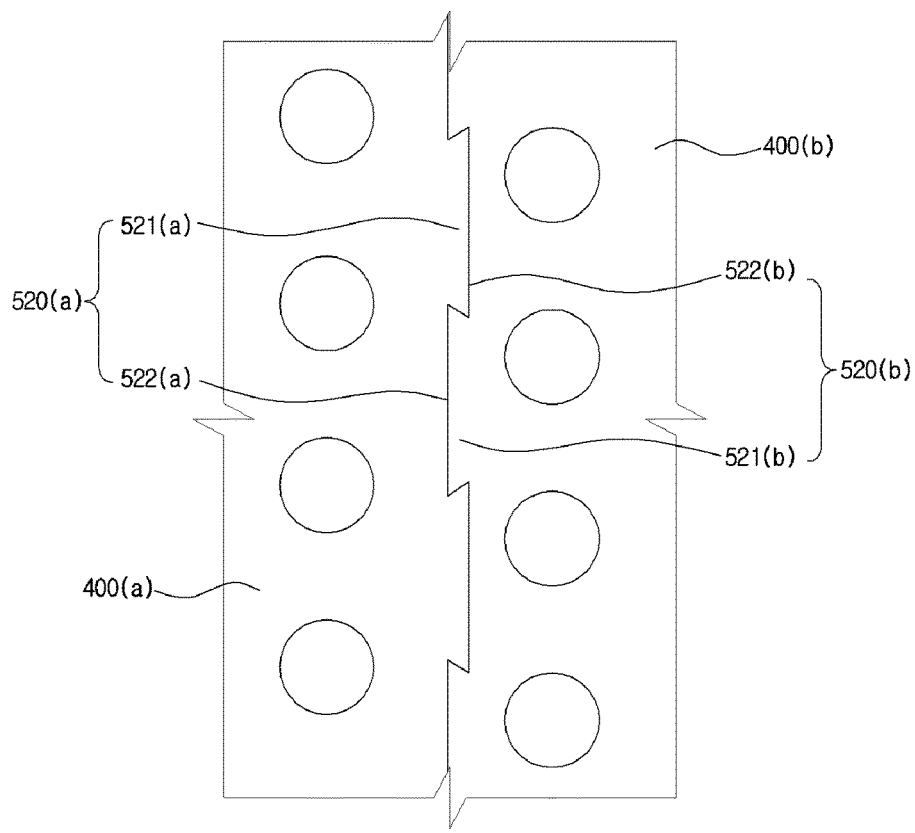

[Fig. 17]
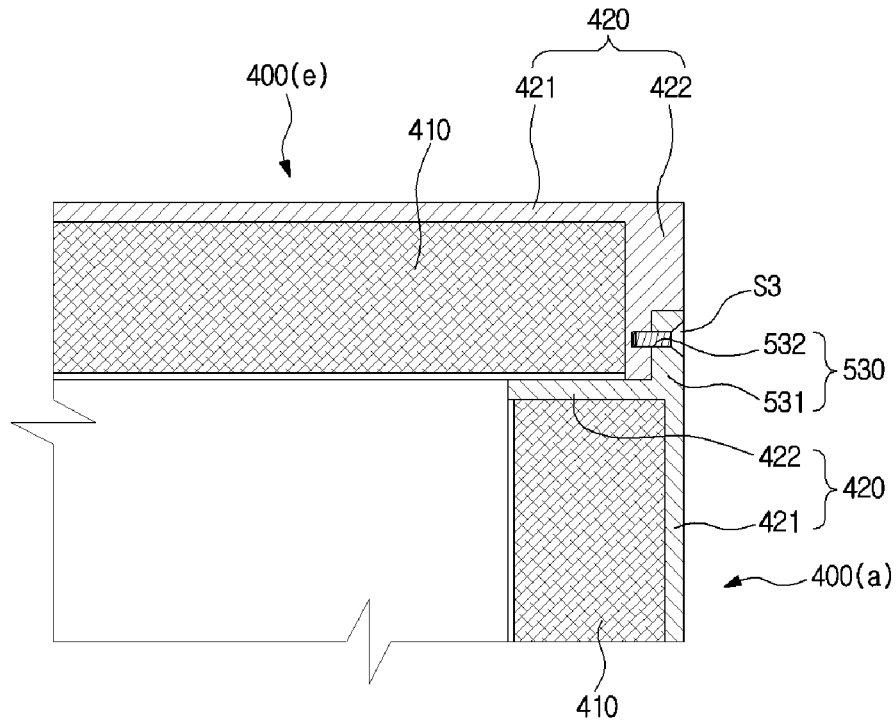
[Fig. 18]
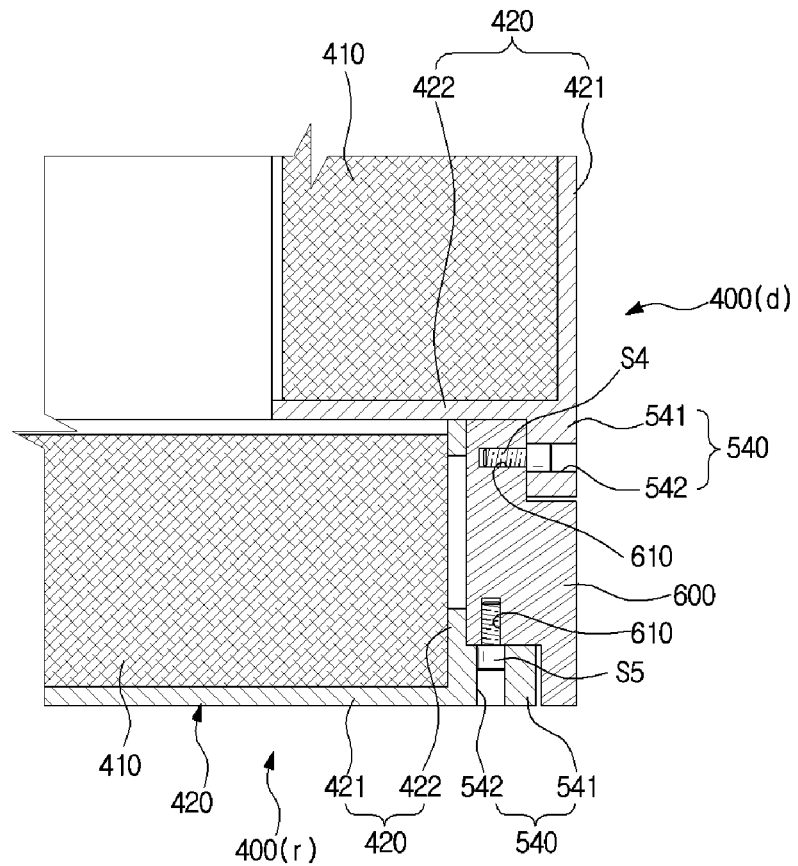

[Fig. 19]
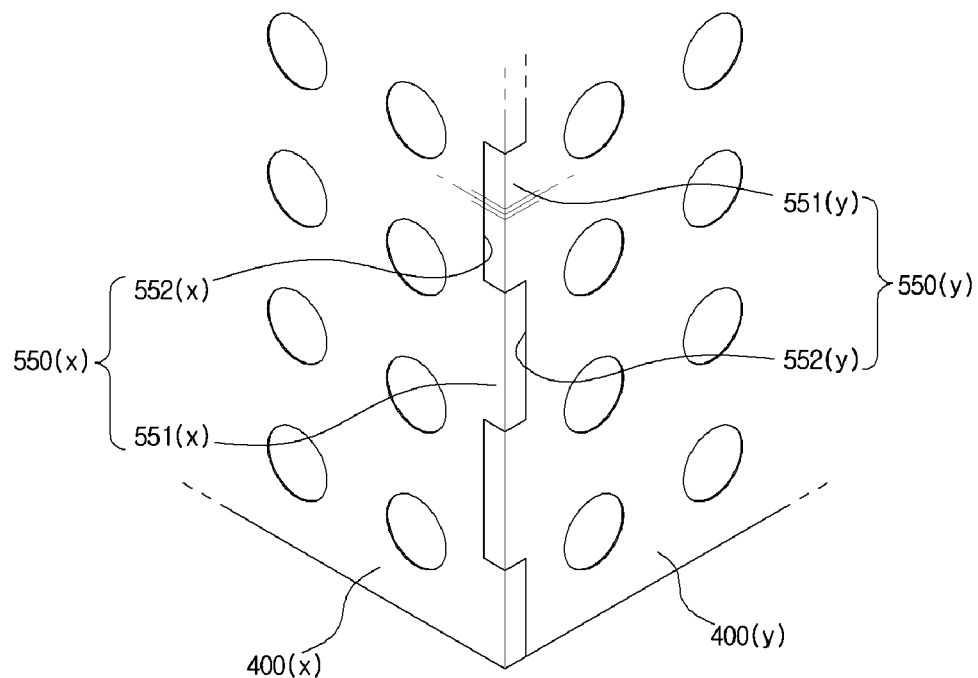
[Fig. 20]
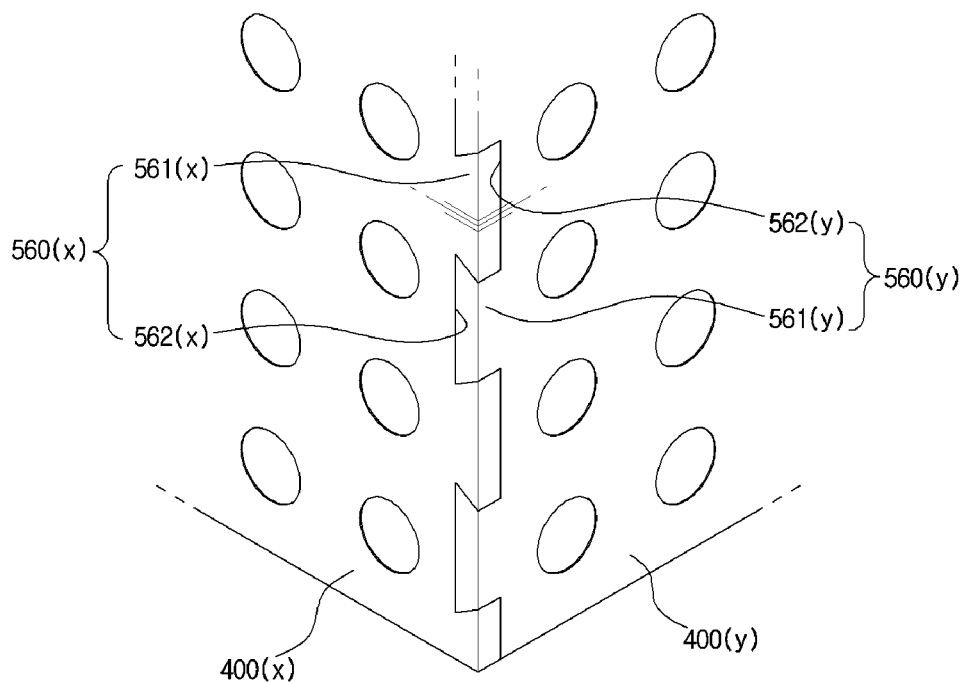

[Fig. 21]
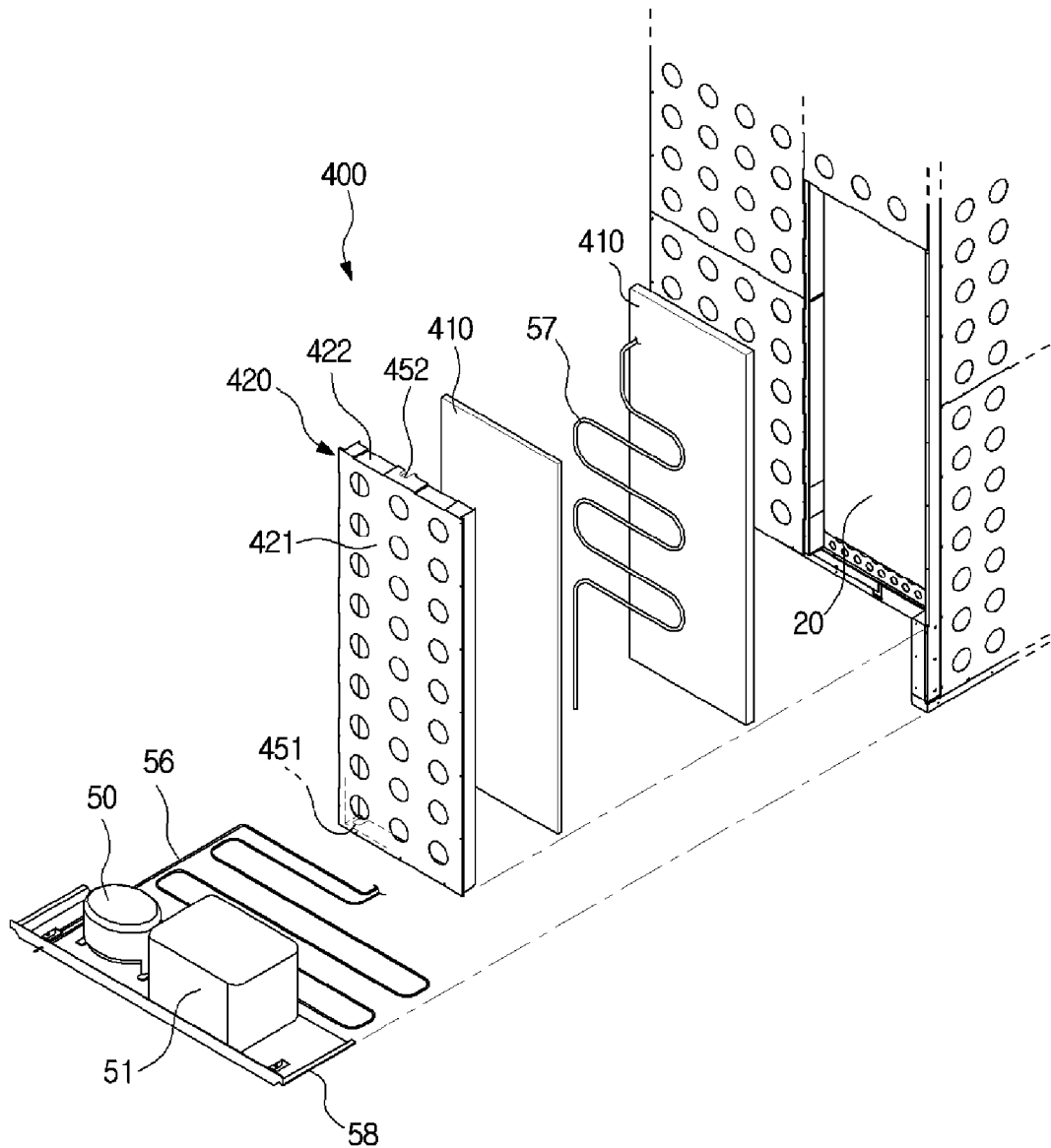

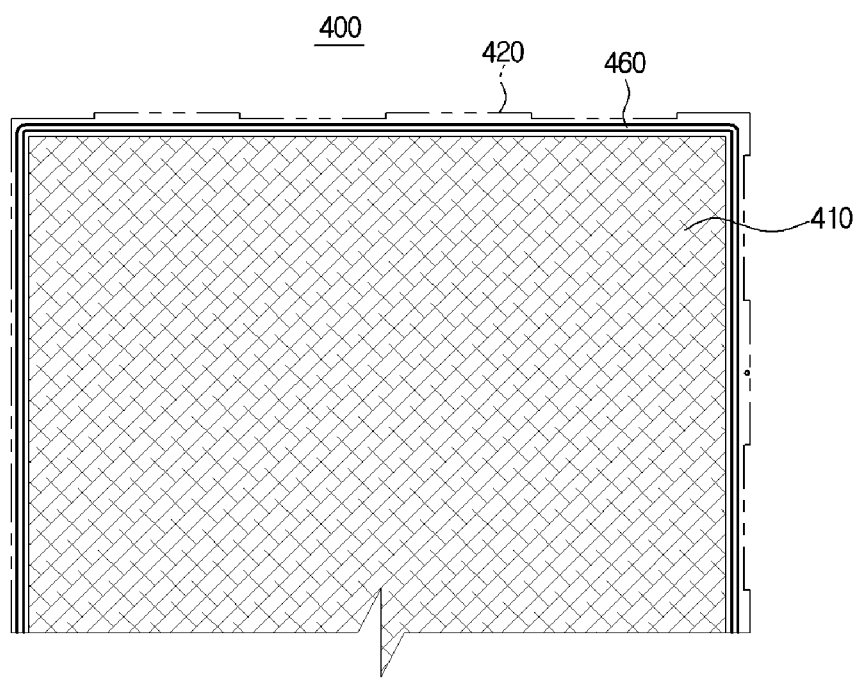
[Fig. 22]

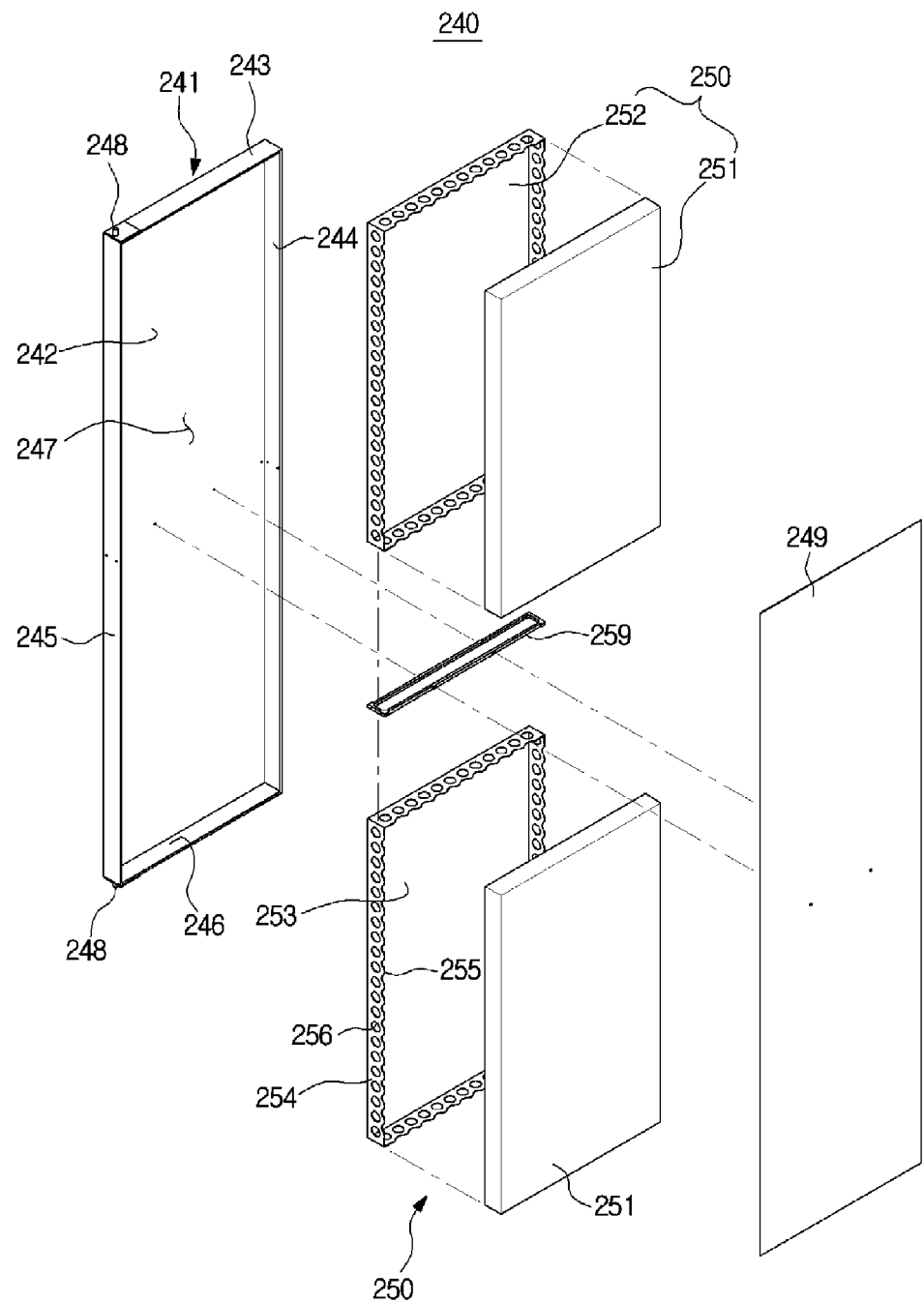
[Fig. 23]

REFRIGERATOR AND VACUUM INSULATION MODULE THEREOF

TECHNICAL FIELD

The present invention relates to a refrigerator, and more particularly, to a refrigerator that is configured by only a vacuum insulator without a foam insulator.

BACKGROUND ART

Generally, a refrigerator is a home appliance for preserving food in a fresh condition provided with a main body, a storage compartment formed in the main body and a cold air supply apparatus supplying cold air to the storage compartment.

The main body of a refrigerator includes an inner case forming the storage compartment, an outer case forming an external appearance provided outside the inner case, and an insulator provided therebetween so as to insulate the storage compartment. A polyurethane foam is generally being used as the insulator.

Since the polyurethane foam insulator provides enough rigidity and fixes the inner case and the outer case through self-adhesive properties, the polyurethane foam insulator is being applied to most commercial refrigerators.

DISCLOSURE OF INVENTION

Technical Problem

However, recently, a vacuum insulator configured by an outer cover material in which the inside is sealed in a vacuum state and a core material provided inside the outer cover material is also used to increase insulation performance. However, even when the vacuum insulator is used, there is a limitation in improving the insulation performance since the polyurethane foam insulator is used together with the vacuum insulator to maintain rigidity and assembly.

Solution to Problem

One aspect of the present invention provides a refrigerator including an inner case; a storage compartment formed inside the inner case; an outer case provided outside the inner case; and a plurality of vacuum insulation modules provided between the inner case and the outer case to insulate the storage compartment, wherein each of the plurality of vacuum insulation modules includes a vacuum insulator including an outer cover material sealed in a vacuum state, and a core material provided inside the outer cover material; and a cartridge which accommodates the vacuum insulator and supports the inner case and the outer case, wherein the cartridge has a mutual coupling portion coupled to the cartridge of an adjacent vacuum insulation module.

The mutual coupling portion may include convex portions and concave portions engaged with the cartridge of an adjacent vacuum insulation module.

The convex portion and the concave portion may have a square shape.

The convex portion may have a dovetail shape which thickens toward the outside.

The mutual coupling portion may include a fastening hole to couple to the cartridge of an adjacent vacuum insulation module by an additional fastening member.

The mutual coupling portion may include a side coupling portion coupled to the cartridge of a vacuum insulation module adjacently disposed on the same plane.

The mutual coupling portion may include a corner coupling portion coupled to the cartridge of a vacuum insulation module adjacently disposed to a corner.

The refrigerator may further include a connecting member provided so as to mutually couple the cartridge of a vacuum insulation module adjacently disposed to a corner.

The cartridge may include a bottom portion, a side wall portion, and an accommodation space formed by the bottom portion and the side wall portion to accommodate the vacuum insulator.

The side wall portion of the cartridge may include a contact protrusion portion projecting toward the inner case or the outer case to contact the inner case or the outer case.

The side wall portion of the cartridge may include a thermal conductivity reduction portion reducing a heat conduction area between the inner case and the outer case.

The thermal conductivity reduction portion may include a groove or a hole formed in the side wall portion of the cartridge.

The side wall portion of the cartridge has a larger thickness than the bottom portion of the cartridge.

The cartridge may include a refrigerant pipe through-hole through which a refrigerant pipe passes, and the refrigerant pipe may be accommodated in the accommodation space of the cartridge.

The cartridge may include an iron core embedded inside the cartridge.

Another aspect of the present invention provides a vacuum insulation module including a vacuum insulator including an outer cover material in which the inside is sealed in a vacuum state and a core material provided inside the outer cover material; and a cartridge including a bottom portion, a side wall portion, and an accommodation space formed by the bottom portion and the side wall portion to accommodate the vacuum insulator. The cartridge may include a mutual coupling portion for coupling.

The mutual coupling portion may include convex portions and concave portions engaged with the cartridge of an adjacent vacuum insulation module.

The mutual coupling portion may include a fastening hole to couple to the cartridge of an adjacent vacuum insulation module by an additional fastening member.

The cartridge may include an iron core embedded inside the cartridge.

Still another aspect of the present invention provides a refrigerator including a main body; a storage compartment formed inside the main body; and a door coupled to the main body to open or close the storage compartment, wherein the door includes a front side plate, a back side plate, and a vacuum insulation module provided between the front side plate and the back side plate to insulate the storage compartment; and the vacuum insulation module includes a vacuum insulator including an outer cover material in which the inside is sealed in a vacuum state, and a core material provided inside the outer cover material, and a cartridge which accommodates the vacuum insulator, and supports the front side plate and the back side plate.

The cartridge may include a bottom portion, a side wall portion, and an accommodation space formed by the bottom portion and the side wall portion to accommodate the vacuum insulator.

The side wall portion of the cartridge may include a contact protrusion portion projecting toward the front side plate or the back side plate to contact the front side plate or the back side plate.

The side wall portion of the cartridge may include a thermal conductivity reduction portion reducing a heat conduction area between the front side plate and the back side plate.

Advantageous Effects of Invention

According to the aspects of the present invention, the main body of the refrigerator may be configured by only a vacuum insulator without using a polyurethane insulator.

According to the aspects of the present invention, since the main body of the refrigerator is configured by only the vacuum insulator which has more excellent insulation performance than the polyurethane insulator, the insulation performance of the refrigerator may be improved and the thickness of the main body of refrigerator may be reduced, thereby relatively enlarging the size of storage space of the storage compartment.

According to the aspects of the present invention, since the main body of the refrigerator may be configured without performing a polyurethane foaming process, the convenience in the assembly of the refrigerator can be enhanced.

According to the aspects of the present invention, a vacuum insulation module may include a mutual coupling portion coupled to an adjacent vacuum insulation module, so that the coupling between the vacuum insulation modules can be facilitated.

BRIEF DESCRIPTION OF DRAWINGS

FIG. 1 is a perspective view illustrating an external appearance of a refrigerator according to an exemplary embodiment of the present invention.

FIG. 2 is a view illustrating the refrigerator of FIG. 1, in which a door is omitted.

FIG. 3 is an exploded perspective view of the refrigerator of FIG. 1.

FIG. 4 is a view illustrating only a plurality of vacuum insulation modules in the refrigerator of FIG. 1.

FIG. 5 is a view illustrating a coupling structure between the plurality of vacuum insulation modules and an inner case of the refrigerator of FIG. 1.

FIG. 6 is a top cross sectional view of the refrigerator of FIG. 1.

FIG. 7 is an enlarged view of portion A of FIG. 6

FIG. 8 is a view illustrating a vacuum insulation module extracted from the refrigerator of FIG. 1.

FIG. 9 is a view illustrating a disassembled vacuum insulation module of the refrigerator of FIG. 1.

FIG. 10 is a view illustrating a detailed configuration of the vacuum insulator of the refrigerator of FIG. 1.

FIG. 11 is an enlarged view of a part of the vacuum insulation module of the refrigerator of FIG. 1.

FIG. 12 is a side view of the vacuum insulation module of the refrigerator of FIG. 1.

FIG. 13 is a cross sectional view taken along line I-I of FIG. 11.

FIG. 14 is a view illustrating a coupling relationship of the vacuum insulation module of the refrigerator of FIG. 1.

FIG. 15 is another view illustrating the coupling relationship of the vacuum insulation module of the refrigerator of FIG. 1.

FIG. 16 is a view illustrating a coupling relationship of a vacuum insulation module of the refrigerator of FIG. 1 according to another exemplary embodiment of the present invention.

FIG. 17 is a cross sectional view taken along line II-II of FIG. 4, illustrating a coupling relationship at a corner of the vacuum insulation module of the refrigerator of FIG. 1.

FIG. 18 is a cross sectional view taken along the line III-III of FIG. 4, illustrating a coupling relationship at the corner of the vacuum insulation module of the refrigerator of FIG. 1.

FIG. 19 is a view illustrating a coupling relationship at the corner of the vacuum insulation module of the refrigerator of FIG. 1 according to another embodiment of the present invention.

FIG. 20 is a view illustrating a coupling relationship at the corner of the vacuum insulation module of the refrigerator of FIG. 1 according to yet another exemplary embodiment of the present invention.

FIG. 21 is a view illustrating another exemplary embodiment of a vacuum insulation module of the refrigerator of FIG. 1.

FIG. 22 is a view illustrating still another exemplary embodiment of a vacuum insulation module of the refrigerator of FIG. 1.

FIG. 23 is a view illustrating a structure of the refrigerator door of FIG. 1.

MODE FOR THE INVENTION

Hereinafter, exemplary embodiments of the present invention will be described in detail.

FIG. 1 is a perspective view illustrating an external appearance of a refrigerator according to an exemplary embodiment of the present invention. FIG. 2 is a view illustrating the refrigerator of FIG. 1, in which a door is omitted. FIG. 3 is an exploded perspective view of the refrigerator of FIG. 1. FIG. 4 is a view illustrating only a plurality of vacuum insulation modules in the refrigerator of FIG. 1. FIG. 5 a view illustrating a coupling structure between the plurality of vacuum insulation modules and an inner case of the refrigerator of FIG. 1. FIG. 6 is a top cross sectional view of the refrigerator of FIG. 1. FIG. 7 is an enlarged view of portion A of FIG. 6.

Referring to FIGS. 1 to 7, a refrigerator 1 is provided with a main body 10 having storage compartments 2 and 3 therein, doors 210 and 240 for opening or closing the storage compartment 2, and a cold air supply apparatus for supplying the storage compartments 2 and 3 with a cold air.

The main body 10 may have an approximate shape of a box. The main body 10 includes an inner case 20, an outer case 40, and a plurality of vacuum insulation modules 400 which insulate the storage compartments 2 and 3 from the outside, provided between the inner case 20 and the outer case 40.

The front side of storage compartments 2 and 3 may be open to allow food to be taken out and put in, and the open front side may be opened or closed by the doors 210 and 240. The doors 210 and 240 may be rotatably coupled to the main body 10 by hinge members 14, 15, 17 and 18.

The storage compartments 2 and 3 may be divided by an intermediate partition wall 11 into a left storage compartment 2, and a right storage compartment 3. However, differently from the exemplary embodiments of the present invention, a storage compartment may also be divided into top and bottom, or top, bottom, left and right. The left storage compartment 2 may be opened or closed by the left door 210, and the right storage compartment 3 may be opened or closed by the right door 240. The left storage compartment 2 and the right storage compartment 3 may be used as a freezer compartment and a cold storage compartment according to each specification, respectively. In the exemplary embodiments of the present invention, the left storage compartment 2 is used as the freezer compartment, and the right storage compartment 3 is used as the cold storage compartment. Here a thickness of a vacuum insulation module 400 insulating the left storage compartment 2 is provided to be larger than a thickness of a vacuum insulation module 400 insulating the right storage compartment 3, as shown in FIG. 6.

A cold air supply apparatus includes a cooling cycle devices including a compressor 50, a condenser 51, an expansion device (not shown), an evaporator 52 of FIG. 6, refrigerant pipes 56 and 57 of FIG. 22 for circulating the refrigerant to each cooling cycle device, and a blower fan (not shown) for forcing air to flow, thereby generating cold air to supply the storage compartments 2 and 3 with the generated cold air.

As shown in FIG. 6, a cooling chamber 55, in which the evaporator 52 is disposed, may be provided inside the main body 10. The cooling chamber 55 may be formed in the storage compartment 2 by being partitioned by an evaporator cover 53. The cold air of the cooling chamber 55 may be supplied to the storage compartment 2 through a through-hole (not shown) formed in the evaporator cover 53, and collected. Unlike in FIG. 6 in which the evaporator 52 and the cooling chamber 55 are provided only in the left storage compartment 2 is illustrated, the evaporator 52 and the cooling chamber 55 may also be provided in the right storage compartment 3. Accordingly, the left storage compartment 2 and the right storage compartment 3 each may be independently cooled.

The inner case 20 may have a shape of a box whose front side is open. The storage compartments 2 and 3 may be formed in the inner case 20. At a lower rear portion of the inner case 20, a machine room may be formed, in which the compressor 50, the condenser 51 or the like may be disposed. The compressor 50 and the condenser 51 may be installed on a base plate 58 of the machine room.

The inner case 20 may have a top wall 21, a bottom wall 22, a left side wall 23, a right side wall 24, a rear wall 25, and machine room walls 24 and 25. The inner case 20 may be formed through a vacuum molding or an injection molding process using a resin material. The inner case 20 may be integrally formed. In a front side of the inner case 20, a gasket may be provided which prevents the cold air from leaking by sealing between the inner case 20 and the doors 210 and 240.

The outer case 40 has a box shape whose front side is open and may be provided to wrap around the inner case 20. The outer case 40 may be formed of a metallic material so as to have rigidity and aesthetics. A hinge reinforcement plate 13, in which upper hinges 14 and 15 are provided, may be connected to a top of the outer case 40, and a hinge reinforcement plate 16, in which lower hinges 17 and 18 are provided, may be connected to a bottom of the outer case 40.

The plurality of vacuum insulation modules 400 may be disposed between the inner case 20 and the outer case 40 by being coupled to the exterior of the inner case 20 and the interior of the outer case 40.

When the main body 10 includes top wall, a left side wall, a right side wall, a rear wall, an intermediate partition wall, and a bottom wall, each may include at least one vacuum insulation module 400. For example, like the exemplary embodiment of the present invention shown in FIG. 5, the top wall of the main body 10 includes four vacuum insulation modules 400(e) to 400(h), the left side wall of the main body 10 includes four vacuum insulation modules 400(i) to 400(l), the right side wall of the main body 10 includes four vacuum insulation modules 400(a) to 400(d), the rear wall of the main body 10 includes four vacuum insulation modules 400(m) to 400(p), the intermediate partition wall of the main body 10 includes one vacuum insulation module 400(q), and the bottom of the main body 10 includes six vacuum insulation modules 400(r) to 400(w). However, this is merely one embodiment, and there is no limit to the number of vacuum insulation modules included in each wall.

Meanwhile, hereinafter, when it is not necessary to classify each of the vacuum insulation modules 400(a) to 400(w), the vacuum insulation modules 400(a) to 400(w) will be collectively referred to as the vacuum insulation module 400.

The vacuum insulation module 400 refers to an assembly of a vacuum insulator 410 of FIGS. 9 and 10, and a cartridge 420 of FIG. 9, specific configurations of the vacuum insulator 410 and the cartridge 420 will be described below.

The vacuum insulation module 400 may insulate the storage compartments 2 and 3 by being provided between the inner case 20 and the outer case 40. Also, the vacuum insulation module 400 may support the inner case 20 and the outer case 40. That is, the vacuum insulation module 400 may prevent the inner case 20 and outer case 40 from warping, sagging and the like. The vacuum insulation module 400 may be connected to the exterior of the inner case 20 and the interior of the outer case 40.

The vacuum insulation module 400 may be connected to the inner case 20 and the outer case 40 through various coupling methods. For example, as shown in FIG. 7, the vacuum insulation module 400 may be coupled to the inner case 20 and outer case 40 through additional fastening members S1 and S2.

In order to achieve this, a fastening hole 28 which fastens the fastening member S1 is formed in the inner case 20, and a fastening hole 471 which fastens the fastening member S1 is formed in the cartridge 420 of the vacuum insulation module 400. Also, a fastening hole 41 which fastens the fastening member S2 is formed in the outer case 40, and a fastening hole 472 which fastens the fastening member S2 is formed in the cartridge 420 of the vacuum insulation module 400. Herein, the fastening members S1 and S2 include any mechanical coupling element such as screws, pins, rivets, bolts.

The fastening member S1 may be fastened in a direction toward the outer case 40 from the inner case 20, and the fastening member S2 may be fastened in a direction toward the inner case 20 from the outer case 40.

However, the method by which the vacuum insulation module 400 is coupled to the inner case 20 and the outer case 40 is not limited to such a method. The vacuum insulation module 400 may be coupled by various methods such as a tight fitting coupling, a sliding coupling, and a coupling through an adhesive member.

FIG. 8 a view illustrating a vacuum insulation module extracted from the refrigerator of FIG. 1. FIG. 9 illustrates a disassembled vacuum insulation module of the refrigerator of FIG. 1. FIG. 10 is a view illustrating a specific configuration of the vacuum insulator of the refrigerator of FIG. 1. FIG. 11 is an enlarged view of a part of the vacuum insulation module of the refrigerator of FIG. 1. FIG. 12 is a side view of the vacuum insulation module of the refrigerator of FIG. 1. FIG. 13 is a cross sectional view taken along line I-I of FIG. 11.

As shown in FIG. 9, the vacuum insulation module 400 may be configured to include the vacuum insulator 410 and the cartridge 420 in which the vacuum insulator 410 is inserted.

As shown in FIG. 10, a vacuum insulator 410 may include an outer cover material 411 in which the inside is sealed in a vacuum state, and a core material 412 provided inside the outer cover material 411 to sustain an atmospheric pressure. As the core material 412, fumed silica, a glass fiber, and the like which have good durability and low thermal conductivity, a glass fiber, and the like may be used. As the outer cover material 411, a deposit material in which a gas, a metal having low moisture permeability, and an inorganic material are deposited, an aluminum foil, and the like may be used.

The vacuum insulator 410 may further include an absorbent 413 for absorbing gas and moisture in the outer cover material 411 to maintain a long-term vacuum state. As the absorbent 413, quicklime (CaO) and the like may be used.

As shown in FIG. 9, the cartridge 420 may include a bottom portion 421, a side wall portion 422, and an accommodation space 427 formed by the bottom portion 421 and the side wall portion 422. In the accommodation space 427, the vacuum insulator 410 may be accommodated by insertion. The side wall portion 422 may include a first wall 423, a second wall 424, a third wall 425, and a fourth wall 426. Accordingly, the side wall portion 422 may have a square shape. However, the shape of the side wall portion 422 is not limited to the square shape, but may also have other polygonal or circular shape.

A top of cartridge 420 may be open and the vacuum insulator 410 may be inserted through the open top. The cartridge 420 may further include a cover (not shown) closing the open top.

With such a configuration, the cartridge 420 may protect the vacuum insulator 410 from external forces. Furthermore, the cartridge 420 itself may perform a function of reinforcing the rigidity of the main body 10 of the refrigerator.

The cartridge 420 may be disposed such that the bottom portion 421 thereof is parallel to the inner case 20 and the outer case 40, and the side wall portion 422 thereof is perpendicular to the inner case 20 and outer case 40. At this time, the bottom portion 421 of the cartridge 420 may be disposed to face the inner case 20, and the open top thereof may be disposed to face the outer case 40, whereas the bottom portion 421 of the cartridge 420 may be disposed to face the outer case 40, and the open top thereof may be disposed to face the inner case 20.

The cartridge 420 may be formed from an engineering plastic material such as a polycarbonate (PC) material, a polystyrene (PS) material, and a polyphenylene sulfide (PPS) material to have a low thermal connectivity and sufficient rigidity. Alternatively, the cartridge 420 may be formed of a steel material, or a stainless steel (SUS) material.

With such a contact on the inner case 20 and the outer case 40, the cartridge 420 may serve as a heat bridge connecting the storage compartments 2 and 3, and the outside of the main body 10, so that a side wall portion 422 of the cartridge 420 may have a contact protrusion 430 projecting toward the inner case 20 or the outer case 40 to minimize a contacting area with the inner case 20 or the outer case 40. That is, only the contact protrusion 430 of the side wall portion 422 may contact the inner case 20 or the outer case 40, while other parts may not contact the inner case 20 or the outer case 40.

The contact protrusion 430 may have a variety of shapes. The contact protrusion 430 in the exemplary embodiment of the present invention which has an approximate square shape is provided to be able to make surface contact with the inner case 20 or the outer case 40, but is not limited thereto, therefor a contact protrusion 430 which has a narrower shape toward the outside may be provided to make line contact or point contact with the inner case 20 or the outer case 40

Further, the side wall portion 422 of the cartridge 420 may have a thermal conductivity reduction portion 440 to reduce a heat conduction area between the inner case 20 and the outer case 40. Herein, when the direction toward the outer case 40 from the inner case 20 is referred to as a heat transfer direction, the heat conduction area refers to a cross sectional area that is perpendicular to the heat transfer direction.

The thermal conductivity reduction portion 440 may include a groove 441 formed to be recessed inward from the side wall portion 422 of the cartridge 420. Further, the thermal conductivity reduction portion 440 may include a hole 442 formed in the side wall portion 422 of the cartridge 420. The shape of the groove 441 and the hole 442 is not limited, as long as thermal conductivity is reduced.

Likewise, openings 480 formed in the bottom portion 421 of the cartridge 420 may also reduce the contact area with the inner case 20 and the outer case 40 and the thermal conductivity between the inner case 20 and the outer case 40.

If a thickness D1 and D2 of FIG. 13 of the side wall portion 422 and the bottom portion 421 becomes large, the rigidity for supporting the inner case 20 and outer case 40 increases, but the thermal conductivity between the inner case 20 and outer case 40 also increases, conversely, if the thickness of the side wall portion 422 and the bottom portion 421 becomes small, the thermal connectivity between the inner case 20 and the outer case 40 is reduced, but the rigidity supporting the inner case 20 and the outer case 40 may be reduced. That is, the main body 10 represents a trade-off relationship between rigidity and heat loss due to the thermal conductivity, the trade-off relationship may be varied according to the thickness of the side wall portion 422 and the bottom portion 421 of the cartridge 420.

Accordingly, the thickness of the side wall portion 422 and the bottom portion 421 of the cartridge 420 may be properly designed according to specifications and key points.

However, as discussed above, since the cartridge 420 is disposed such that the bottom portion 421 is parallel to the inner case 20 and the outer case 40, and the side wall portion 422 thereof is perpendicular to the inner case 20 and the outer case 40, more load may be applied to the side wall portion 422 of the cartridge 420 than the bottom portion 421 of the cartridge 420.

Accordingly, it may be desirable that the thickness D1 of FIG. 13 of the side wall portion 422 of the cartridge 420 is provided to be larger than the thickness D2 of FIG. 13 of the bottom portion 421 of the cartridge 420.

FIG. 14 is a view illustrating a coupling relationship of the vacuum insulation module of the refrigerator of FIG. 1. FIG. 15 is another view illustrating the coupling relationship of the vacuum insulation module of the refrigerator of FIG. 1. FIG. 16 is a view illustrating a coupling relationship of the vacuum insulation module of the refrigerator of FIG. 1 according to another exemplary embodiment of the present invention. FIG. 17 is a cross sectional view taken along line II-II of FIG. 4, illustrating a coupling relationship at a corner of the vacuum insulation module of the refrigerator of FIG.

1. FIG. 18 is a cross sectional view taken along line III-III of FIG. 4, illustrating a coupling relationship at the corner of the vacuum insulation module of the refrigerator of FIG. 1. FIG. 19 is a view illustrating a coupling relationship at the corner of the vacuum insulation module of the refrigerator of FIG. 1 according to another embodiment of the present invention. FIG. 20 is a view illustrating a coupling relationship at the corner of the vacuum insulation module of the refrigerator of FIG. 1 according to yet another exemplary embodiment of the present invention.

Referring to FIGS. 14 to 20, a mutual coupling portion which is provided in a cartridge for coupling to a cartridge of an adjacent vacuum insulation module will be described.

As described above, the vacuum insulation module 400 is coupled to the inner case 20 and the outer case 40. Furthermore, among the plurality of vacuum insulation modules 400 according to an exemplary embodiment of the present invention, the adjacent vacuum insulation modules 400 are mutually coupled to each other. Accordingly, a coupling force of the vacuum insulation module 400 is further enhanced and assembly thereof may be facilitated.

Specifically, the cartridge 420 of the vacuum insulation module 400 may include mutual coupling portions 510, 520, 530, 540, 550, and 560 which are connected to a cartridge 420 of an adjacent vacuum insulation module 400.

As shown in FIGS. 14 and 15, the mutual coupling portion 510 may include a side coupling portion for coupling the adjacent vacuum insulation module 400 on the same plane. The side coupling portion may include a convex portion 511 and concave portion 512.

For example, as shown in FIG. 15, a vacuum insulation module 400(*a*) and a vacuum insulation module 400(*b*), which are adjacent to each other on the same plane, may respectively have a mutual coupling portion 510(*a*) and a mutual coupling portion 510(*b*).

The mutual coupling portions 510(*a*) and 510(*b*) may be disposed to engage with each other. That is, the mutual coupling portion 510(*a*) may have a convex portion 511(*a*) and concave portion 512(*a*), and the mutual coupling portion 510(*b*) may have a convex portion 511(*b*) and concave portion 512(*b*).

Herein, the convex portion 511 and convex portion 512 may each have a square shape, and the convex portion 511 may be coupled to the corresponding concave portion 512 in a tight fitting manner. The convex portion 511 and the concave portion 512 may be formed in the side wall portion 422 of the cartridge 420.

However, the shape of the convex portion 511 and the concave portion 512 is not limited to such a square shape.

For example, as shown in FIG. 16, a convex portion 521(*a*) of a mutual coupling portion 520(*a*), and a convex portion 521(*b*) of a mutual coupling portion 520(*b*) may each have a dovetail shape which thickens toward the outside. By having such a shape, the coupling force between the mutual coupling portions 520 may be further enhanced. Reference numerals 522(*a*) and 522(*b*) are the concave portions of the coupling portions 520(*a*) and 520(*b*), respectively.

Furthermore, the convex portion and the concave portion may have other circular or polygonal shapes in addition to the dovetail shape, as long as corresponding convex portions and concave portions may be coupled to each other in a tight fitting manner.

As shown in FIG. 17, a mutual coupling portion 530 may have a corner coupling portion coupled to a vacuum insulation module which is disposed adjacent to the corner.

The corner coupling portion may include an extension portion 531 extending from the bottom portion 421 of the cartridge 420, and a fastening hole 532 formed in the extension portion 531. An additional fastening member S3 may be fastened to the fastening hole 532.

Accordingly, for example, the vacuum insulation module 400(*a*) and the vacuum insulation module 400(*e*) disposed mutually adjacent to the corner may be coupled to each other by the fastening member S3. Herein, the fastening member S3 includes any mechanical coupling elements such as screws, pins, rivets, bolts.

Further, as shown in FIG. 18, vacuum insulation modules disposed mutually adjacent to the corner may be coupled to each other through an additional coupling member 600 and additional fastening members S4 and S5.

For example, the vacuum insulation module 400(*r*) and the vacuum insulation module 400(*d*) disposed mutually adjacent to the corner may include a mutual coupling portion 540 and the mutual coupling portion 540 may include an extension portion 541 extending from the bottom portion 421 of the cartridge 420 and a fastening hole 542 formed on the extension portion 541. The fastening members S4 and S5 may be fastened to the fastening hole 542.

A fastening hole 610 which is fastened by the fastening members S4 and S5 is also formed in the coupling member 600, and the fastening members S4 and S5 are fastened to the fastening hole 542 and the fastening hole 610 to mutually couple the vacuum insulation module 400(*r*), the coupling member 600, and the vacuum insulation module 400(*d*) to each other. Herein, the fastening members S3 and S4 include any mechanical coupling elements such as screws, pins, rivets, bolts.

In this way, the vacuum insulation modules adjacent to the corner may be mutually coupled to each other through an additional fastening member or coupling member.

However, the vacuum insulation modules adjacent to the corner may also be coupled to each other by a method using the convex portion and the concave portion described above in a tight fitting manner, in addition to the coupling method using the fastening member or the coupling member.

For example, as shown in FIG. 19, a vacuum insulation module 400(*x*) and a vacuum insulation module 400(*y*) mutually adjacent to the corner may have a mutual coupling portion 550(*x*) and a mutual coupling portion 550(*y*), respectively.

The mutual coupling portion 550(*x*) and the mutual coupling portion 550(*y*) may be disposed to engage with each other. That is, the mutual coupling portion 550(*x*) may have a convex portion 551(*x*) and a concave portion 552(*x*), and the mutual coupling portion 550(*y*) may have a convex portion 551(*y*) and a concave portion 552(*y*).

Herein, the convex portion 551 and the concave portion 552 may each have a square shape, and the convex portion 551 may be coupled to the corresponding concave portion 552 in a tight fitting manner.

Further, as shown in FIG. 20, a convex portion 561(*x*) of a mutual coupling portion 560(*x*), and a convex portion 561(*y*) of a mutual coupling portion 560(*y*) may each have a dovetail shape thickening toward the outside. By having such a shape, a coupling force between the mutual coupling portions 560 may be further enhanced. Reference numerals 562(*x*) and 562(*y*) are concave portions of the mutual coupling portion 560(*x*) and the mutual coupling portion 560(*y*), respectively.

FIG. 21 is a view illustrating another exemplary embodiment of a vacuum insulation module of the refrigerator of FIG. 1.

Referring to FIG. 21, refrigerant tubes 56 and 57 for connecting a cooling cycle device such as a compressor 50, a condenser 51, an expansion device (not shown), and an evaporator 52, and for circulating a refrigerant passes through refrigerant pipe through-holes 451 and 452 formed in the side wall portion 422 of the cartridge 420, so that at least a part 57 may be accommodated in an accommodation space of the cartridge 420.

In the side wall portion 422 of the cartridge 420, a plurality of refrigerant pipe through-holes 451 and 452 are formed, and the refrigerant pipes 56 and 57 may be guided into the inside of the cartridge 420 through any one of the refrigerant pipe through-holes 451 and 452, and may leave the cartridge 420 through another refrigerant through-holes 451 and 452.

With such a configuration, the refrigerant pipes 56 and 57 pass through the vacuum insulation module 400, and connect the compressor 50 and the condenser 51 disposed in the mechanic room, and the evaporator 52 disposed in the storage compartment.

FIG. 22 is a view illustrating still another exemplary embodiment of a vacuum insulation module of the refrigerator of FIG. 1.

As sown in FIG. 22, a vacuum insulation module 400 may further include an iron core 460 embedded inside the cartridge 420 to reinforce rigidity of the cartridge 420. The iron core 460 may be embedded inside the cartridge 420 so as not to be exposed to the outside. The iron core 460 may be disposed along the side wall portion 422 of the cartridge 420 in a loop shape. The iron core 460 may be formed of a steel material, a stainless steel (SUS) material, aluminum, and the like.

FIG. 23 is a view illustrating a structure of the refrigerator door of FIG. 1.

Not only a main body of a refrigerator, but the refrigerator doors 210 and 240 may also be configured of only the vacuum insulation module without a foam insulator. The left door 210 and the right door 240 have the same configuration, so a description will be only given for the right door 240.

The door 240 may include a front side plate 241, a back side plate 249 coupled to a back of the front side plate 241, and a vacuum insulation module 250 provided between the front side plate 241 and the back side plate 249 to insulate the storage compartments 2 and 3.

The front side plate 241 may have an approximate shape of a box which includes a front surface 242, a top surface 243, a left surface 244, a right surface 245, and a bottom surface 246, and an accommodation space 247 which accommodates the vacuum insulation module 250 may be formed between the front side plate 241 and the back side plate 249.

At least one vacuum insulation module 250 may be provided. The vacuum insulation module 250 may not only insulate the storage compartments 2 and 3, but also support the front side plate 241 and the back side plate 249.

When a plurality of vacuum insulation modules 250 are provided, an auxiliary support member 259 may be disposed between the vacuum insulation modules 250.

The vacuum insulation module 250 may include a vacuum insulator 251 and a cartridge 252 accommodating the vacuum insulator 251. The cartridge 252 may have a bottom portion 253, a side wall portion 254, and an accommodation space 257 formed by the bottom portion 253 and the side wall portion 254 to accommodate the vacuum insulator 251. A top of the cartridge 252 is open so that the vacuum insulator 251 may be inserted through the open top.

The bottom portion 253 of the cartridge 252 may be disposed to face toward the front side plate 241 and a top of the side wall portion 254 may be disposed to face the back side plate 249, or vice versa.

The side wall portion 254 of the cartridge 252 may include a contact protrusion 255 projecting to contact the front side plate 241 or the back side plate 249, and an opening 256 for reducing the thermal conductivity by reducing the heat conduction area.

Technical ideas of the present invention have been described according to certain exemplary embodiments as above, but the present invention is not limited the exemplary embodiments. Various modifications and variations can be made by those skilled in the art without departing from the spirit of the present invention as the technical idea described in the claims.

The invention claimed is:

1. A refrigerator, comprising:
   an inner case;
   a storage compartment formed by the inner case;
   an outer case provided outside the inner case; and
   a plurality of vacuum insulation modules provided between the inner case and the outer case to insulate the storage compartment;
   wherein each of the plurality of vacuum insulation modules includes a vacuum insulator and a cartridge,
   wherein the vacuum insulator includes:
      an interior space,
      an outer cover material enclosing the interior space, the interior space being sealed in a vacuum state, and
      a core material provided in the interior space,
   wherein the cartridge is configured to protect the vacuum insulator and provide structural support for the inner case and the outer case, the cartridge accommodating the vacuum insulator, and supporting the inner case and the outer case,
   wherein the cartridge includes:
      a mutual coupling portion for coupling to a cartridge of an adjacent vacuum insulation module, among the plurality of vacuum insulation modules,
      a bottom wall portion,
      a side wall portion extending from the bottom wall portion, and
      a side wall portion extending from the bottom wall portion, and
      an accommodation space formed by the bottom wall portion and the side wall portion to accommodate the vacuum insulator,
   wherein the vacuum insulator is accommodated in the accommodation space and surrounded by the bottom wall portion and the side wall portion, and
   wherein the cartridge is disposed between the inner case and the outer case such that the bottom wall portion is parallel to the inner case and the outer case and the side wall portion is perpendicular to the inner case and the outer case.

2. The refrigerator of claim 1, wherein the mutual coupling portion includes one or more convex portions and one or more concave portions engaged with the cartridge of an adjacent vacuum insulation module, among the plurality of vacuum insulation models.

3. The refrigerator of claim 2, wherein the one or more convex portions and the one or more concave portions have a square shape.

4. The refrigerator of claim 2, wherein the one or more convex portions have a dovetail shape which thickens toward an outside.

5. The refrigerator of claim 1, wherein the mutual coupling portion includes a fastening hole to couple to the cartridge of an adjacent vacuum insulation module, among the plurality of vacuum insulation modules, by an additional fastening member.

6. The refrigerator of claim 1, wherein the mutual coupling portion includes a side coupling portion coupled to the cartridge of an adjacent vacuum insulation module, among the plurality of vacuum insulation modules, adjacently disposed on a same plane.

7. The refrigerator of claim 1, wherein the mutual coupling portion includes a corner coupling portion coupled to the cartridge of an adjacent vacuum insulation module, among the plurality of vacuum insulation modules, adjacently disposed to a corner.

8. The refrigerator of claim 1, further comprising:
a connecting member provided so as to mutually couple the cartridge of an adjacent vacuum insulation module, among the plurality of vacuum insulation modules, adjacently disposed to a corner.

9. The refrigerator of claim 1, wherein the side wall portion of the cartridge includes a contact protrusion portion projecting toward the inner case or the outer case to contact the inner case or the outer case.

10. The refrigerator of claim 1, wherein the side wall portion of the cartridge includes a thermal conductivity reduction portion reducing a heat conduction area between the inner case and the outer case.

11. The refrigerator of claim 10, wherein the thermal conductivity reduction portion includes a groove or a hole formed in the side wall portion of the cartridge.

12. The refrigerator of claim 1, wherein the side wall portion of the cartridge has a larger thickness than the bottom wall portion of the cartridge.

13. The refrigerator of claim 1, wherein the cartridge includes a refrigerant pipe through-hole through which a refrigerant pipe passes, and the refrigerant pipe is accommodated in the accommodation space of the cartridge.

14. The refrigerator of claim 1, wherein the cartridge includes an iron core embedded inside the cartridge.

* * * * *